April 10, 1956  E. R. ROSS  2,741,334
SELF-ENERGIZING WHEEL BRAKE
Filed Jan. 21, 1952  2 Sheets-Sheet 1
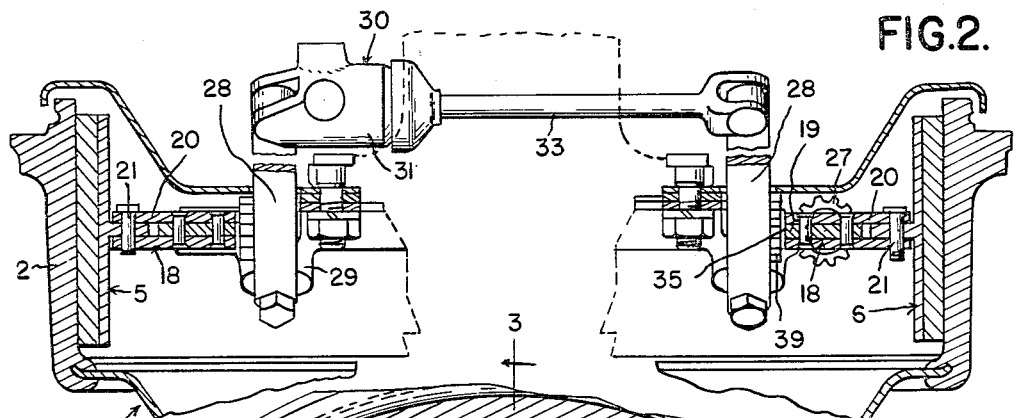
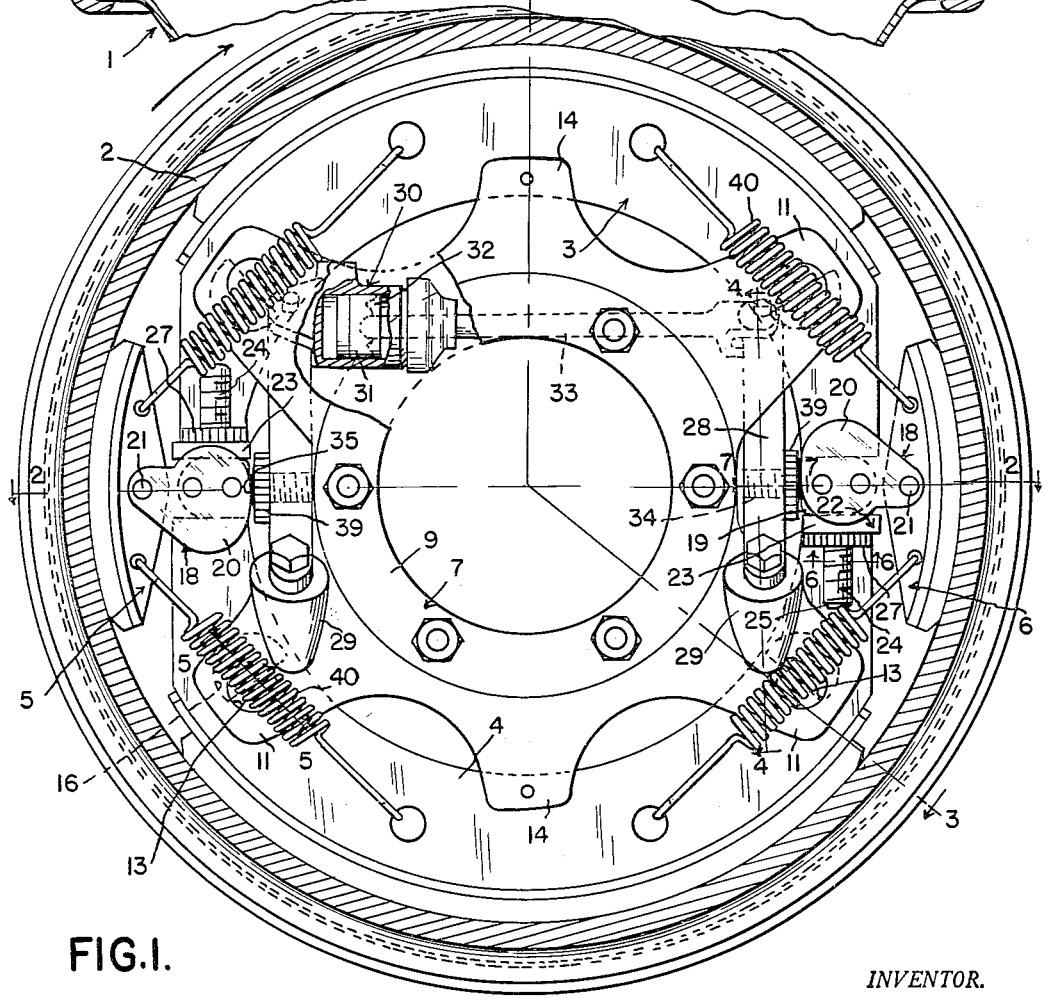
INVENTOR.
ELMER R. ROSS
BY
ATTORNEYS April 10, 1956 — E. R. ROSS — 2,741,334
SELF-ENERGIZING WHEEL BRAKE
Filed Jan. 21, 1952 — 2 Sheets-Sheet 2
FIG.4.
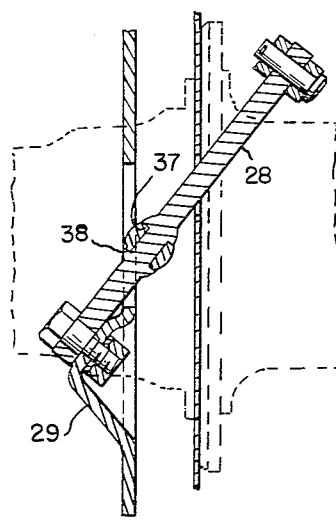
FIG.3.
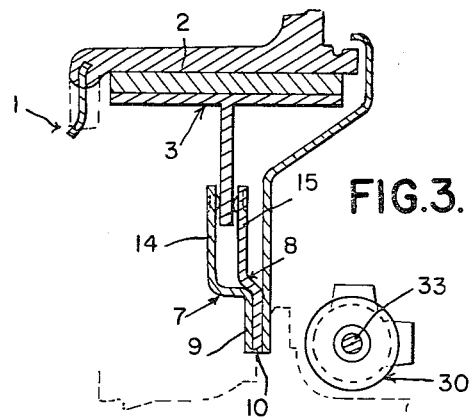
FIG.5.
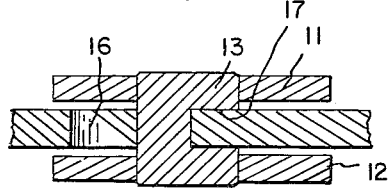
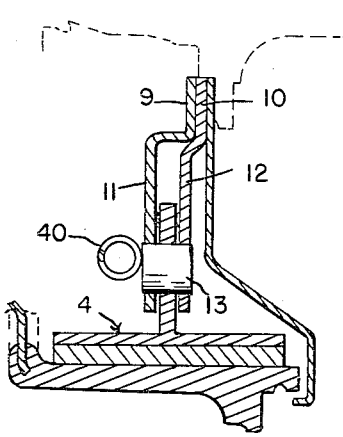
FIG.6.
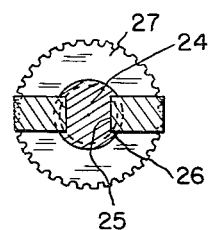
FIG.7.
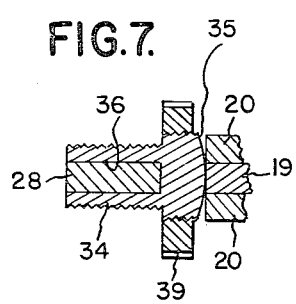
INVENTOR.
ELMER R. ROSS
BY
ATTORNEYS

2,741,334

SELF-ENERGIZING WHEEL BRAKE

Elmer R. Ross, Detroit, Mich., assignor to Kelsey-Hayes Wheel Company, Detroit, Mich., a corporation of Delaware Application January 21, 1952, Serial No. 267,327

7 Claims. (Cl. 188—74)

The invention relates to brakes and refers more particularly to brakes of the drum and shoe type.

The invention has for one of its objects to provide a brake which is powerful in operation and which requires relatively low operating pressure.

The invention has for another object to provide a brake having a plurality of brake shoes which upon being moved against a brake drum when rotating serve to move other brake shoes against the brake drum.

The invention has for further objects to provide a brake in which the auxiliary shoes initially engageable with the drum are operatively connected to cams for engaging the main shoes with the drum and these cams in addition to applying the main shoes are movable to apply the auxiliary shoes; to provide a brake having a simple powerful lever construction operable upon the cams to initially apply the auxiliary shoes; and to provide a brake in which the means for operating upon the cams to apply the auxiliary shoes serves to fulcrum the cams.

With these and other objects in view, the invention resides in the novel features of construction, combinations and arrangements of parts as more fully herinafter set forth:

In the drawings:

Figure 1 is an elevation partly broken away and in section of a brake embodying the invention;

Figure 2 is a combined top plan view and cross section with the wheel cylinder and associated parts included in the top plan view and the cross section on the line 2—2 of Figure 1;

Figures 3, 4, 5, 6, and 7 are cross sections on the lines 3—3, 4—4, 5—5, 6—6, and 7—7 respectively of Figure 1.

The brake, as illustrated, is a motor vehicle wheel brake of that type having a brake drum which is secured to and revoluble with the hub of a ground engaging wheel of a motor vehicle and also having internal friction elements within and engageable with the annular brake flange of the drum. The drum 1 is a composite drum having the cast iron brake flange 2. The friction elements comprise the pair of main brake shoes 3 and 4 and the pair of auxiliary brake shoes 5 and 6, all of these shoes being of T-shaped section. The auxiliary shoes are located diametrically opposite each other between the main shoes. The brake backing element is formed of the backing plates 7 and 8 having the central portions 9 and 10 fixedly secured in the present instance to the radial flange at one end of the axle housing of the motor vehicle. The backing plates also have the offset axially spaced radial arms 11 and 12 through which extend the anchor pins 13 and further have the offset intermediate axially spaced radial arms 14 and 15 guiding the main shoes. The main shoes are arranged to anchor near their opposite ends on the anchor pins depending on the direction of rotation of the drum, the webs of the main shoes having near their ends the semi-circular opening 16 and the anchor pins having intermediate their ends the semi-circular slots 17 for receiving the webs of the main shoes and presenting rectilinear bases having anchor abutment with the rectilinear edge portions of the openings.

For the purpose of moving the main shoes 3 and 4 into engagement with the drum, there are the applying members 18 adjacent to and acting on each pair of ends of the main shoes. Each applying member comprises the cam 19 located between the adjacent ends of the main shoes and the plates 20 at opposite sides of and fixedly secured to the cam. The plates extend radially outwardly beyond the radially outer end of the cam to embrace the webs of the adjacent auxiliary shoes 5 and 6 and be pivotally connected thereto midway of their ends by the pivot pins 21. Each main shoe has one end of its web extending between the plates 20 and engaging a cam and the other end provided with the adjustment device 22 which has a part extending between the plates and engaging a cam at the opposite side. Each adjustment device is preferably located at the leading end of a shoe and comprises a threaded member and a nut. The threaded member has the rectangular head 23 and the integral threaded shank 24, the head extending between the plates 20 and engaging the adjacent cam 19. The threaded shank extends into the slot 25 formed in the end portion of the web of a main shoe and is formed with the diametrically opposite longitudinally extending grooves 26 slidably receiving the portions of the shoe web bordering the longitudinal edges of the slot. The shank has adjustably threaded thereon the nut 27 which abuts the end of the shoe web. It is apparent that by rotatably adjusting the nut on the shank it is possible to compensate for wear of the linings of the main shoes.

The plate arrangement provides for axially positioning the applying members by the main shoes and axially positioning the auxiliary shoes by the applying members.

To move the auxiliary shoes into engagement with the brake flange, there are the levers 28 for actuating the cams. The levers are vertically inclined to and extend through the backing plates 7 and 8 and are pivotally mounted at their inner ends upon the bosses 29 of the axially outer backing plate 7. The levers are operatively connected at their outer ends outside the backing plates to an actuator common to both levers. The actuator, as shown, is a wheel cylinder 30 comprising the cylinder 31 pivotally connected to the outer end of one of the levers, the piston 32 slidable within the cylinder and the piston rod 33 having one end universally mounted in the piston and the other end pivotally connected to the outer end of the other lever. The levers are each provided with the threaded member 34 having the rounded convex end 35 engaging the radially inner end of the adjacent cam 19, and forming a fulcrum for the cam. Each threaded member is formed with a diametrical slot 36 for receiving one of the levers 28, the slot extending from the inner end of the lever to a point spaced from its convex end. Each threaded member also has the flat opposite sides 37 extending transversely of the slot and engaged by the enlargements 38 formed on the lever, the nut 39 threaded on the threaded member and located between one of the levers 28 and the adjacent cam 19 and abutting the lever is rotatably adjustable to compensate for wear of the lining of the associated auxiliary shoe.

For the purpose of retracting the main and auxiliary shoes upon releasing the pressure in the wheel cylinder there are the coil springs 40 extending between the adjacent ends of the main and auxiliary shoes.

In operation, it will be seen that when the wheel cylinder 30 is subjected to braking fluid under pressure by the operator of the motor vehicle, it operates to spread apart the outer ends of the levers 28 and these levers acting through the threaded members 34 move the applying members 18 radially outwardly. The applying members act upon the auxiliary shoes 5 and 6 to force the same into engagement with the brake flange 2 of the drum and with the drum rotating in the direction of the arrow as indicated in Figure 2 the auxiliary shoes move in a clockwise direction and swing the cams 19 of the applying members about the fulcrums formed by the convex ends 35 of the threaded members 34 thereby spreading apart the ends of the main shoes 3 and 4 and forcing these shoes into engagement with the brake flange. Upon relieving the pressure of the braking liquid in the wheel cylinder the parts will return to their normal positions as shown in Figure 2 under the influence of the retracting springs 40. In the event of wear of the linings of the auxiliary shoes, the nuts 39 may be turned to compensate for the wear and in the event of wear of the linings of the main shoes the nuts 27 may be turned to compensate for the wear.

What I claim as my invention is:

1. A brake comprising a brake drum, a pair of main brake shoes within and engageable with said drum, a pair of cams with one between and acting on each pair of adjacent shoe ends to spread the latter apart upon angular movement of said cams, a pair of auxiliary brake shoes within and engageable with said drum between said main shoes, one of said auxiliary shoes being radially outwardly of and adjacent each cam and connected to the cam for angularly moving the cam upon engagement of the auxiliary shoe with said drum when said drum is rotating, and means engaging the radially inner ends of said cams for moving said auxiliary shoes into engagement with said drum, said means constituting fulcruming means for said cams.

2. A brake comprising a brake drum, a pair of main brake shoes within and engageable with said drum, a pair of cams with one between and acting on each pair of adjacent shoe ends to spread the latter apart upon angular movement of said cams, a pair of auxiliary brake shoes within and engageable with said drum between said main shoes, one of said auxiliary shoes being radially outwardly of and adjacent each cam and connected to the cam for angularly moving the cam upon engagement of the auxiliary shoe with said drum when said drum is rotating, and lever means operatively connected to said cams to move the same radially outwardly and thereby move said auxiliary shoes into engagement with said drum, said lever means constituting fulcruming means for said cams.

3. A brake comprising a brake drum, a pair of brake shoes within and engageable with said drum, a pair of cams with one adjacent and acting on each pair of adjacent shoe ends, a pair of other brake shoes within and engageable with said drum between said first mentioned shoes, said other shoes being radially outwardly of said cams, plates at opposite sides of and fixedly secured to said cams and pivotally connected to said other shoes, said plates embracing axially opposite portions of said first and second mentioned shoes, and means engaging the radially inner ends of said cams for moving said other shoes into engagement with said drum, said means constituting fulcruming means for said cams.

4. A brake comprising a brake drum, a pair of brake shoes within and engageable with said drum, a pair of cams with one adjacent and engageable with each pair of adjacent shoe ends to spread the latter apart upon angular movement of said cams, a pair of other brake shoes within and engageable with said drum between said first mentioned shoes, said other shoes being radially outwardly of said cams, plates at opposite sides of and fixedly secured to said cams and pivotally connected to said other shoes for angularly moving said cams upon engagement of said other shoes with said drum when the latter is rotating, said plates embracing axially opposite portions of said first mentioned shoes, thereby providing for axial positioning of said cams by said first mentioned shoes and axial positioning of said other shoes by said cams, and means engaging the radially inner ends of said cams for moving said other shoes into engagement with said drum, said means constituting fulcruming means for said cams and being radially adjustable to compensate for wear of the linings of said other shoes.

5. A brake comprising a drum, main brake shoes within and engageable with said drum, applying members with one between and acting on each pair of adjacent shoe ends to spread the latter apart upon angular movement of said applying members, auxiliary brake shoes within and engageable with said drum between said main shoes, one of said auxiliary shoes being radially outwardly of and adjacent each applying member and connected to the applying member for angularly moving the same upon engagement of the auxiliary shoe with said drum when said drum is rotating, and means engaging said members for moving said auxiliary shoes into engagement with said drum, said means constituting fulcruming means for said applying members.

6. A brake comprising a drum, main brake shoes within and engageable with said drum, each shoe having an end adjacent an end of the other, an applying member between and acting on the adjacent ends of said main shoes to spread the latter apart upon angular movement of said applying member, an auxiliary brake shoe within and engageable with said drum between the adjacent ends of said main shoes, said auxiliary shoe being radially outwardly of said applying member and connected thereto for angularly moving the same upon engagement of the auxiliary shoe with said drum when said drum is rotating, and means engaging said applying member for moving said auxiliary shoe into engagement with said drum, said means constituting fulcruming means for said applying member.

7. A brake comprising a brake drum, main brake shoes within and engageable with said drum, each shoe having an end adjacent an end of the other, a cam between and acting on the adjacent ends of said main shoes to spread the latter apart upon angular movement of said cam, an auxiliary brake shoe within and engageable with said drum between the adjacent ends of said main shoes, said auxiliary shoe being radially outwardly of said cam and connected thereto for angularly moving the same upon engagement of said auxiliary shoe with said drum when said drum is rotating, plates at opposite sides of said cam embracing axially opposite portions of said main shoes, thereby providing for axial positioning of said cam by said main shoes and axial positioning of said auxiliary shoe by said cam, and means for moving said auxiliary shoe into engagement with said drum.

References Cited in the file of this patent
UNITED STATES PATENTS

| | | |
|---|---|---|
| 1,761,043 | Lavoie | June 3, 1930 |
| 1,787,527 | Huck | Jan. 6, 1931 |
| 2,031,517 | Van Brunt | Feb. 18, 1936 |
| 2,120,917 | Hause | June 14, 1938 |
| 2,347,388 | Ayers | Apr. 25, 1944 |
| 2,599,247 | Forbes | June 3, 1952 |